(12) United States Patent
Chen et al.

(10) Patent No.: US 8,204,275 B2
(45) Date of Patent: Jun. 19, 2012

(54) OPTICAL POSITIONING APPARATUS AND POSITIONING METHOD THEREOF

(75) Inventors: Yu-Hsiang Chen, Taipei (TW); An-Shun Cheng, Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 450 days.

(21) Appl. No.: 12/616,787

(22) Filed: Nov. 12, 2009

(65) Prior Publication Data

US 2011/0110559 A1    May 12, 2011

(51) Int. Cl.
  *G06K 9/00* (2006.01)
  *G01B 11/14* (2006.01)

(52) U.S. Cl. .......... 382/103; 382/291; 356/614

(58) Field of Classification Search .......... 382/100, 382/103, 106–108, 123, 154, 162, 168, 173, 382/181, 193–195, 199, 203, 232, 254, 274, 382/276, 286–291, 305, 312, 317–321; 356/601, 356/603, 610, 614; 348/42, 157
See application file for complete search history.

(56) References Cited

U.S. PATENT DOCUMENTS

| | | | | |
|---|---|---|---|---|
| 6,650,360 | B1* | 11/2003 | Osen | 348/157 |
| 6,690,474 | B1* | 2/2004 | Shirley | 356/603 |
| 7,187,401 | B2* | 3/2007 | Alhadef et al. | 348/42 |
| 7,391,522 | B2* | 6/2008 | Sasaki | 356/601 |
| 2008/0106746 | A1* | 5/2008 | Shpunt et al. | 356/610 |
| 2009/0153881 | A1* | 6/2009 | Cho et al. | 356/614 |

* cited by examiner

*Primary Examiner* — Seyed Azarian
(74) *Attorney, Agent, or Firm* — Lin & Associates IP, Inc.

(57) ABSTRACT

An optical positioning apparatus and method are adapted for determining a position of an object in a three-dimensional coordinate system which has a first axis, a second axis and a third axis perpendicular to one another. The optical positioning apparatus includes a host device which has a first optical sensor and a second optical sensor located along the first axis with a first distance therebetween, and a processor connected with the optical sensors, and a calibrating device placed in the sensitivity range of the optical sensors with a second distance between an origin of the second axis and a coordinate of the calibrating device projected in the second axis. The optical sensors sense the calibrating device to make the processor execute a calibrating procedure, and then sense the object to make the processor execute a positioning procedure for determining the position of the object in the three-dimensional coordinate system.

8 Claims, 6 Drawing Sheets

OPTICAL POSITIONING APPARATUS AND POSITIONING METHOD THEREOF

BACKGROUND OF THE INVENTION

1. Field of the Invention

The present invention generally relates to a positioning apparatus, and more particularly to an optical positioning apparatus and a positioning method thereof.

2. The Related Art

Optical positioning apparatuses are well known. They are utilized in a variety of applications, including common automatic toilet flushers, video games, and sophisticated laser guided munitions etc. It is an example that optical mice control the video games as follows. The optical mouse relies on a light emitting diode (LED) illuminating a surface at grazing incidence, a two-dimensional CMOS detector which captures the resultant images, software that correlates successive images to determine the position, and speed sensors determining the speed the mouse has been moved.

However, the optical mouse has disadvantages of complicated layout and use. Moreover, when the LED becomes dimmer, the optical mouse suffers from a low optical efficiency, and relatively indistinct resultant images so that results in a worse positioning accuracy. So it would be desirable to provide an improved optical positioning apparatus capable of overcoming the foregoing problems.

SUMMARY OF THE INVENTION

An object of the present invention is to provide an optical positioning apparatus adapted for determining a position of an object in a three-dimensional coordinate system which has a first axis, a second axis and a third axis perpendicular to one another. The optical positioning apparatus includes a host device, and a calibrating device. The host device has a first optical sensor and a second optical sensor located along the first axis with a first distance therebetween. The host device further has a processor connected with the first and the second optical sensors. The calibrating device is placed in the sensitivity range of the first and the second optical sensors with a second distance between an origin of the second axis and a coordinate of the calibrating device projected in the second axis. The first and the second optical sensors sense the calibrating device to make the processor execute a calibrating procedure, then the first and the second optical sensors sense the object to make the processor execute a positioning procedure for further determining the position of the object in the three-dimensional coordinate system.

Another object of the present invention is to provide an optical positioning method adapted for determining a position of an object in a three-dimensional coordinate system which has a first axis, a second axis and a third axis perpendicular to one another. The optical positioning method includes the following steps. Locate a first optical sensor and a second optical sensor along the first axis with a first distance therebetween. Place a calibrating device in the sensitivity range of the first and the second optical sensors with a second distance between an origin of the second axis and a coordinate of the calibrating device projected in the second axis. The first and the second optical sensors sense the calibrating device to obtain a first image and then transmit the first image to a processor. The processor receives the first image and then calculates a ratio of an actual dimension of the calibrating device to a corresponding pixel of the first image. The first and the second optical sensors sense the object to obtain a second image and a third image respectively. The processor receives the second image and the third image, and then determines a first coordinate and a second coordinate of the object sensed in the second image and the third image respectively. The processor calculates first, second and third included angles according to corresponding inverse trigonometric functions by means of the first coordinate, the second coordinate, the ratio and the second distance, wherein the first included angle is formed between the second axis and a straight line passing through the first optical sensor and a coordinate that the object is projected in the plane established by the first axis and the second axis, the second included angle is formed between the second axis and a straight line passing through the second optical sensor and the coordinate that the object is projected in the plane established by the first axis and the second axis, and the third included angle is formed between the second axis and a straight line passing through the object and a coordinate that the object is projected in the first axis. Finally the processor obtains a coordinate of the object in the three-dimensional coordinate system by means of the first distance and the first, second and third included angles to show the position of the object in the three-dimensional coordinate system.

As described above, the optical positioning apparatus and method of the present invention utilize the first and the second optical sensors to sense the calibrating device and the object, then utilize the processor to execute the calibrating procedure and finally execute the positioning procedure to obtain the coordinate of the object in the three-dimensional coordinate system. Therefore, the optical positioning apparatus and method have advantages of easy layout and use.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
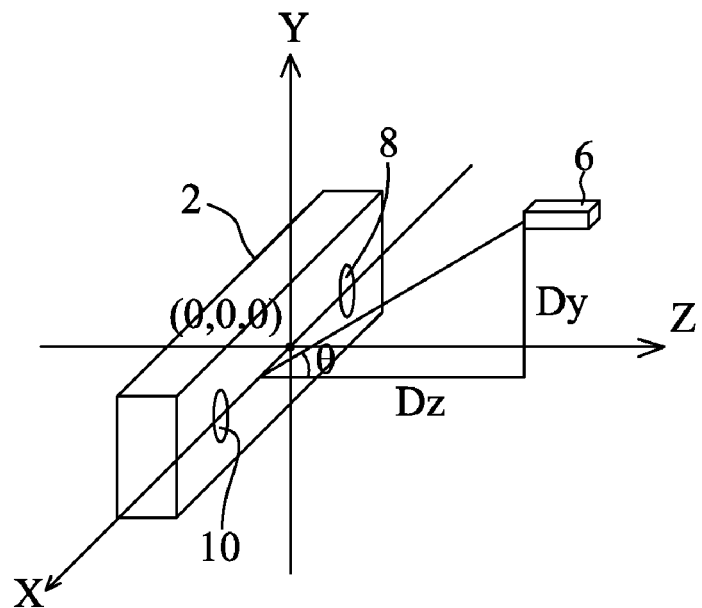
FIG. 1 is a view of an optical positioning apparatus in accordance with a first embodiment of the present invention, wherein an object is located to be determined a position thereof in a three-dimensional coordinate system.
Figure 2:
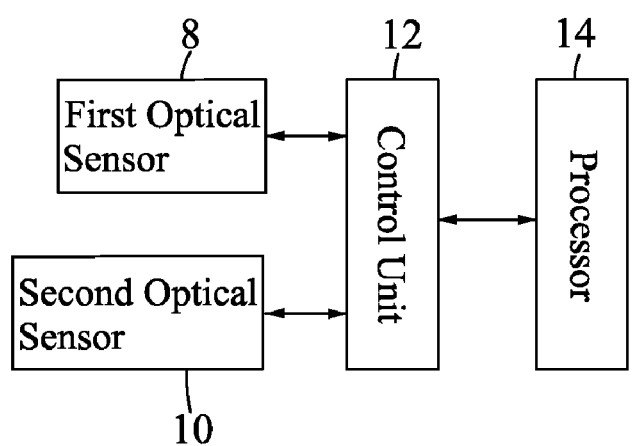
FIG. 2 is a block diagram of a host device of the optical positioning apparatus of FIG. 1.
Figure 4:
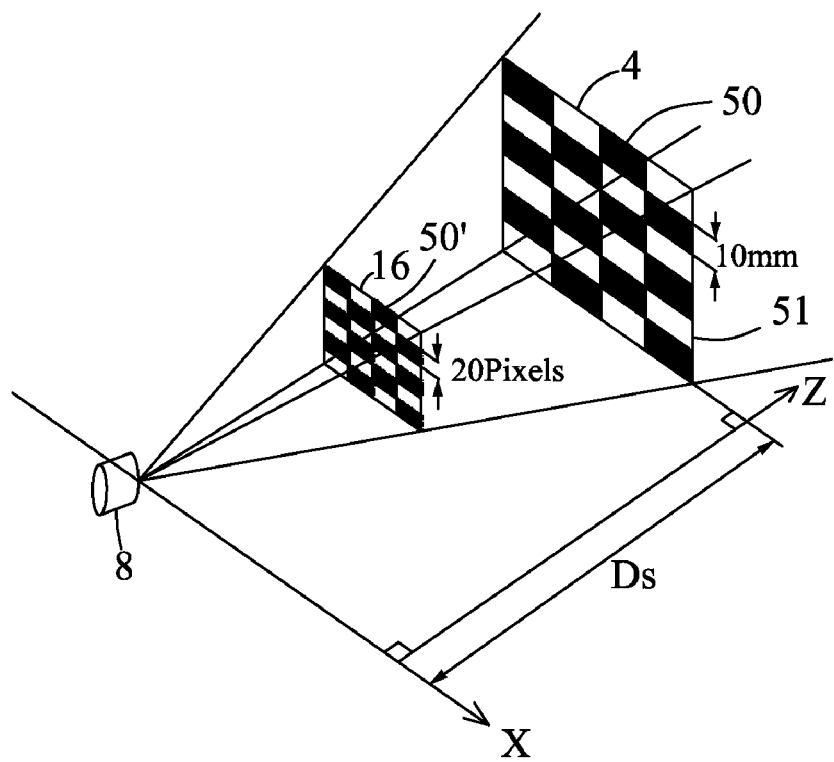
FIGS. 4-7 are functional diagrams showing that the optical positioning apparatus of FIG. 1 determines the position of the object in the three-dimensional coordinate system based on a parallax principle.

With reference to FIG. 1, FIG. 2 and FIG. 4, an optical positioning apparatus according to a first embodiment of the present invention is adapted for determining a position of an object 6 in a three-dimensional coordinate system which has a first axis X, a second axis Z and a third axis Y to obtain a coordinate (Dx, Dz, Dy), where Dx is the coordinate of the object 6 in the first axis X, Dz is the coordinate of the object 6 in the second axis Z, and Dy is the coordinate of the object 6 in the third axis Y. The optical positioning apparatus includes a host device 2 and a calibrating device 4.

Referring to FIG. 2 again, the host device 2 includes a first optical sensor 8, a second optical sensor 10, a control unit 12 and a processor 14. The first optical sensor 8 and the second optical sensor 10 are respectively connected with the control unit 12, and the control unit 12 is further connected with the processor 14. The control unit 12 receives image signals of the calibrating device 4 and the object 6 sensed by the first optical sensor 8 and the second optical sensor 10 and then transmits the image signals to the processor 14. The processor 14 firstly executes a calibrating procedure and finally executes a positioning procedure based on a parallax principle to obtain the coordinate (Dx, Dz, Dy) of the object 6 in the three-dimensional coordinate system.

Figure 6:
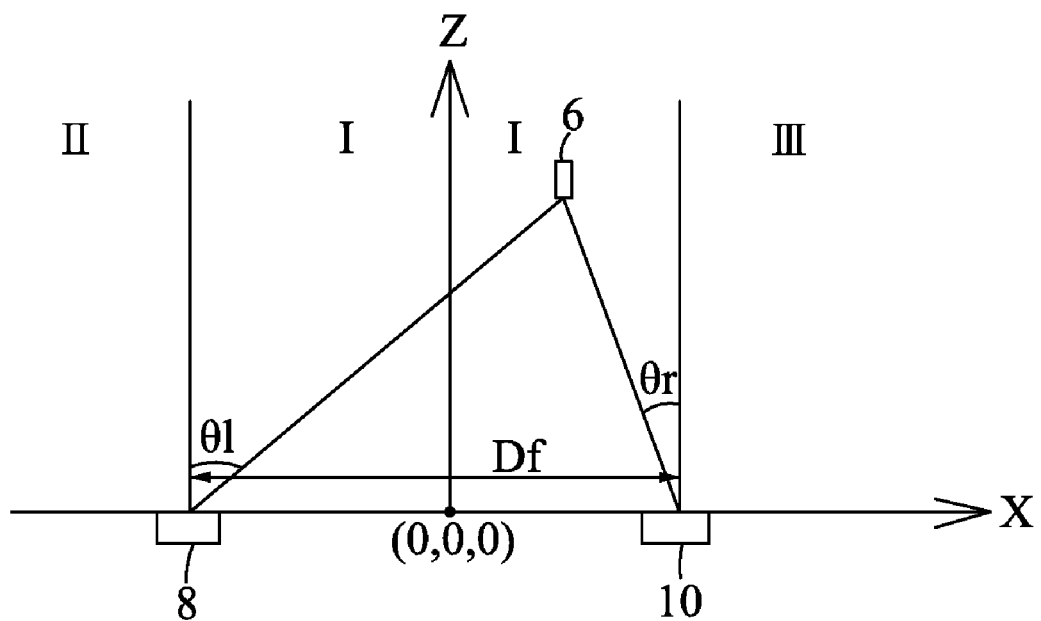
Figure 7:
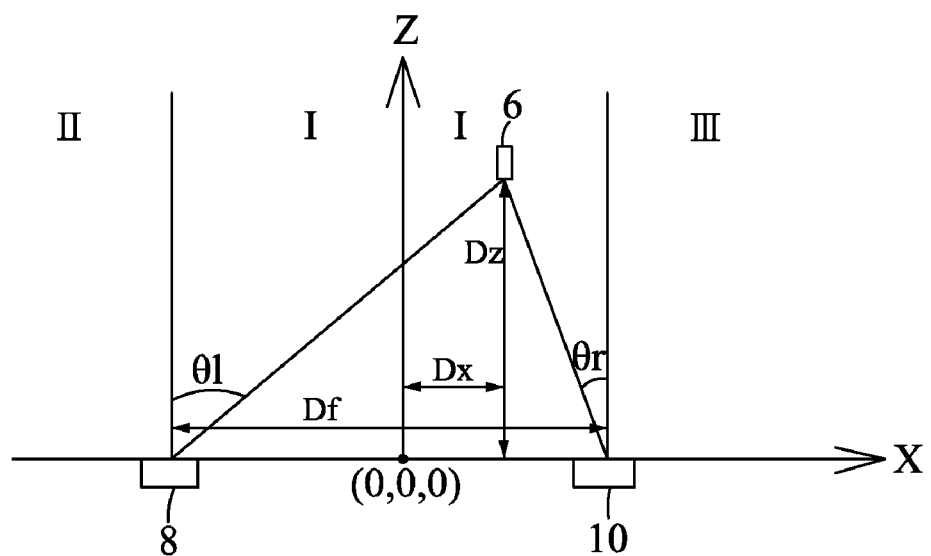

Referring to FIG. 1, FIG. 6 and FIG. 7, the first optical sensor 8 and the second optical sensor 10 are located along the first axis X and apart from each other to define a first distance Df therebetween. A midpoint of the first distance Df is acted as an origin (0, 0, 0) of the three-dimensional coordinate system. Furthermore, the first optical sensor 8 is located at a negative axis of the first axis X and the second optical sensor 10 is located at a positive axis of the first axis X. The first and the second optical sensors 8, 10 may be either CMOS image sensors or CCD image sensors.

Figure 5:
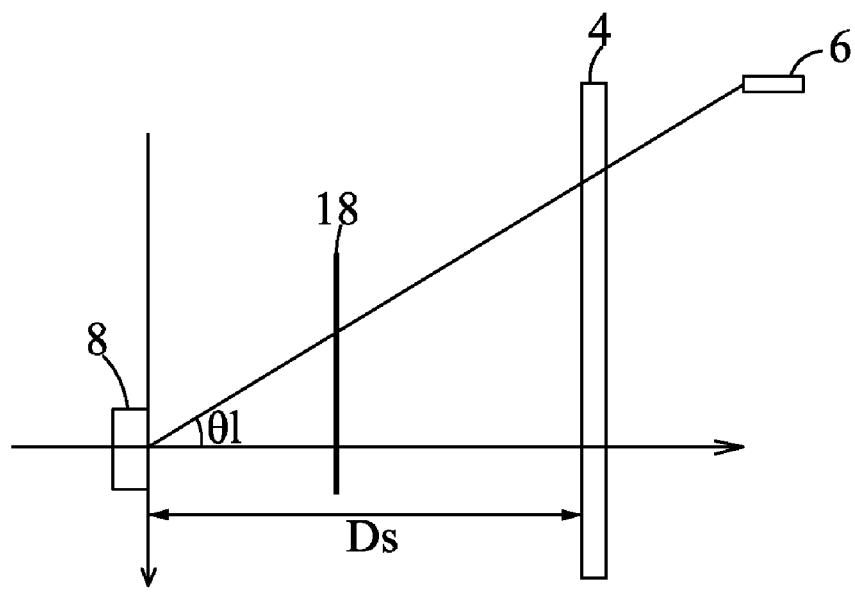

Referring to FIG. 4 and FIG. 5, when the optical positioning apparatus is started to determine the position of the object 6 in the three-dimensional coordinate system, the calibrating device 4 is firstly placed in the sensitivity range of the first optical sensor 8 and the second optical sensor 10. The calibrating device 4 is further perpendicular to the second axis Z, and there is a second distance Ds between the calibrating device 4 and the first axis X in which the first optical sensor 8 and the second optical sensor 10 are aligned. Then the first optical sensor 8 and the second optical sensor 10 respectively sense the calibrating device 4 and obtain a first image 16. Furthermore, the first and the second optical sensors 8, 10 transmit an actual dimension of the calibrating device 4 and a pixel of the first image 16 to the processor 14 through the control unit 12. Then the processor 14 calculates a ratio R of the actual dimension of the calibrating device 4 to the pixel of the first image 16. In this embodiment, the calibrating device 4 is a calibrating plate made up of a plurality of black blocks 50 and a plurality of white blocks 51 being alternately arranged with one another. If the black block 50 of the calibrating device 4 has an about 10 mm height and the height of a corresponding black block 50' in the first image 16 is 20 Pixels, then the ratio R of the actual dimension of the calibrating device 4 to the pixel of the first image 16 will be equal to 0.5 mm/pixel.

Referring to FIG. 1 and FIGS. 5-7 again, then the object 6 is placed in the sensitivity range of the first and the second optical sensors 8, 10 with the coordinate (Dx, Dz, Dy) in the three-dimensional coordinate system. Accordingly, the coordinate (Dx, Dz, 0) is that the object 6 is projected in the plane established by the first axis X and the second axis Z, and the coordinate (Dx, 0, 0) is that the object 6 is projected in the first axis X. A first included angle θ1 is formed between the second axis Z and a straight line passing through the coordinate (Dx, Dz, 0) and the first optical sensor 8, a second included angle θr is formed between the second axis Z and a straight line passing through the coordinate (Dx, Dz, 0) and the second optical sensor 10, and a third included angle θ is formed between the second axis Z and a straight line passing through the coordinate (Dx, Dz, Dy) and the coordinate (Dx, 0, 0). Then the first optical sensor 8 and the second optical sensor 10 sense the object 6 to obtain a second image 18 and a third image (not shown) respectively, and the processor 14 can further determine coordinates of the object 6 sensed in the second image 18 and the third image respectively designated as a first coordinate (x, z, y) (not shown) and a second coordinate (x', z', y') (not shown). Next, the processor 14 calculates the included angles θ1, θr, θ according to an inverse trigonometric function base on the first coordinate (x, z, y), the second coordinate (x', z', y'), the ratio R and the second distance Ds.

Figure 3:
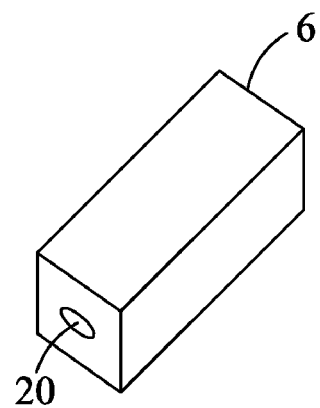
FIG. 3 is a view of the object shown in FIG. 1.

Referring to FIG. 1, FIG. 3 and FIG. 5, the object 6 is a handle with a light source 20 being disposed in one end surface thereof so as to be sensed by the first and the second optical sensors 8, 10 respectively. The light source 20 is sensed as a light point in the second image 18 and the third image, and further sensed at the first coordinate (x, z, y) in the second image 18 and the second coordinate (x', z', y') in the third image. In the first embodiment, the second image 18 and the third image are respectively a VGA (Video Graphics Array) image with 640*480 pixels that are viewed by the first axis X and the third axis Y, so the first coordinate is designated as (x, y) and the second coordinate is designated as (x', y'), wherein either x or x' is any number in the range from 0 to 639 along the first axis X and either y or y' is any number in the range from 0 to 479 along the third axis Y. Furthermore, y=y' because the first and the second optical sensors 8, 10 are located in the plane established by the first axis X and the second axis Z. So the included angles θ1, θr, θ will be calculated according to the respective inverse trigonometric function as following: θ1=arctan(x*R/Ds), θr=arctan(x'*R/Ds) and θ=arctan(y*R/Ds). If (x, y)=(336, 240), (x', y')=(146, 240) and Ds=200 mm, then the corresponding angles will be that θ1=arctan(336*0.5/200)=40 degrees, θr=arctan(146*0.5/200)=20 degrees and θ=arctan(240*0.5/200)=31 degrees.

Referring to FIG. 1 and FIG. 7 again, then the processor 14 calculates the coordinate (Dx, Dz, Dy) of the object 6 in the three-dimensional coordinate system by means of the first distance Df and the included angles θ1, θr, θ. The method of calculating Dz of the coordinate (Dx, Dz, Dy) is described as follows. Firstly, the sensitivity range of the first and the second optical sensors 8, 10 is divided into three districts along the first axis X respectively designated as a second district II, a first district I and a third district III, wherein the first district I refers to the space between the first optical sensor 8 and the second optical sensor 10, the second district II refers to the space adjacent to the first optical sensor 8 and away from the second optical sensor 10, and the third district III refers to the space adjacent to the second optical sensor 10 and away from the first optical sensor 8. Then which district the object 6 located at is determined by the processor 14 according to the first coordinate (x, z, y) and the second coordinate (x', z', y').

When the object 6 is located at the first district I, the formula calculating Dz of the coordinate (Dx, Dz, Dy) is: Dz=Df/(|tan θ1|+|tan θr|). When the object 6 is located at the second district II, the formula calculating Dz of the coordinate (Dx, Dz, Dy) is: Dz=Df/(|tan θr|−|tan θ1|). When the object 6 is located at the third district III, the formula calculating Dz of the coordinate (Dx, Dz, Dy) is: Dz=Df/(|tan θ1|−|tan θr|). If the object 6 is located at the first district I and Df=300 mm, then according to the above-mentioned corresponding formula it will be: Dz=300/(|tan 40|+|tan 20|)=249.

The formula of calculating Dx of the coordinate (Dx, Dz, Dy) is described as following: Dx=Dz*tan θ1−Df/2. So Dx=249*tan 40−300/2=59 in the first embodiment. Besides, the first optical sensor 8 and the second optical sensor 10 may be haphazard located along the first axis X. In such situation, the sign of Dx depends on an offset of the object 6 being apart from the origin (0, 0, 0) of the three-dimensional coordinate system. If there is a positive offset, then Dx=|Dx|. On the contrary, if there is a negative offset, then Dx=−|Dx|.

Lastly, the formula of calculating Dy of the coordinate (Dx, Dz, Dy) is described as following: Dy=Dz*tan θ. So Dy=249*tan 31=149. Therefore, the coordinate (59, 249, 149) is obtained to show the position of the object 6 in the three-dimensional coordinate system.

Figure 8:
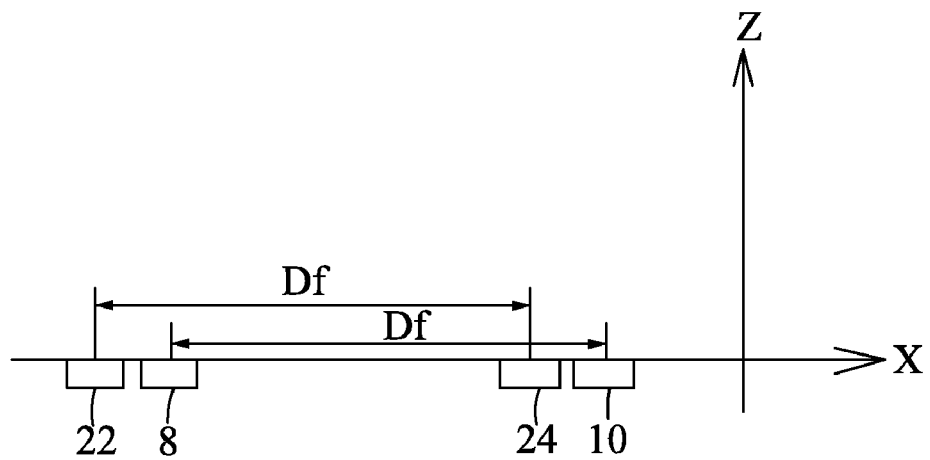
FIG. 8 is a partial view of an optical positioning apparatus in accordance with a second embodiment of the present invention.
Figure 9:
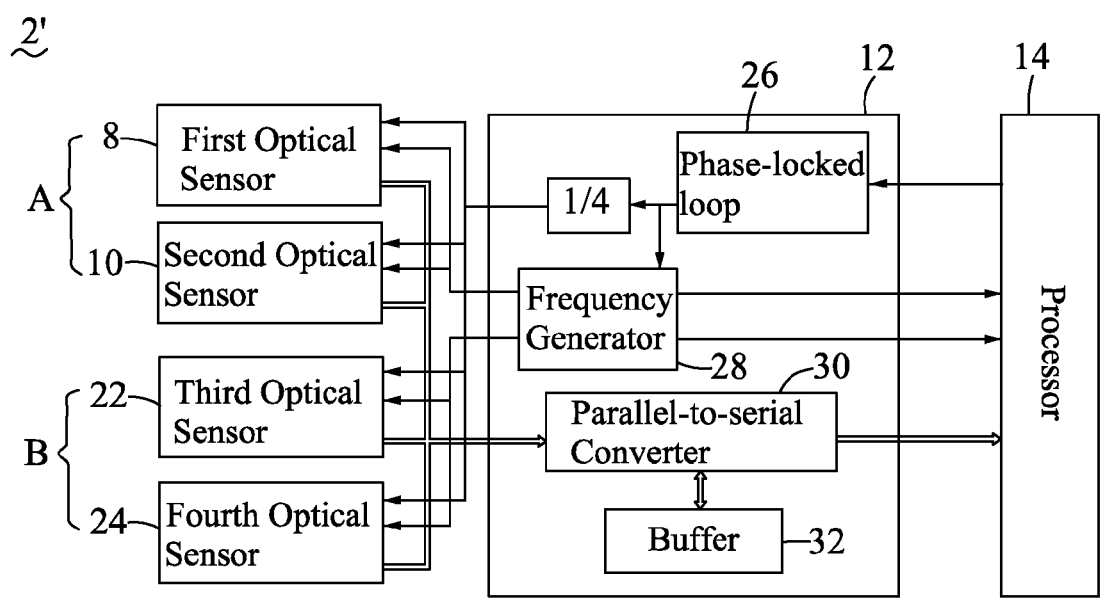
FIG. 9 is a block diagram of a host device of the optical positioning apparatus of FIG. 8.

Referring to FIG. 8 and FIG. 9, an optical positioning apparatus according to a second embodiment of the present invention is similar to the one in the first embodiment. The difference therebetween is that a host device 2' in the second embodiment includes two groups of sensors designated as a first group of sensors A and a second group of sensors B. The first group of sensors A includes a first optical sensor 8 and a second optical sensor 10, and the second group of sensors B includes a third optical sensor 22 and a fourth optical sensor 24. The third optical sensor 22 and the fourth optical sensor 24 are respectively located beside the first optical sensor 8 and the second optical sensor 10 along the first axis X to further define a first distance Df therebetween. In the second embodiment, either the first group of sensors A or the second group of sensors B can provide a 30 Frame/S output respectively, so both the first and the second groups of sensors A, B can provide a 60 Frame/S output in total under normal surrounding and can also provide a 30 Frame/S output in total even if the surrounding becomes dimmer so that can accurately obtain the coordinate (Dx, Dz, Dy) of the object 6 in the three-dimensional coordinate system. Moreover, the optical positioning apparatus of the second embodiment can further obtain an acceleration of the object 6 on account of the 60 Frame/S output from both the first and the second groups of sensors A, B doubling a sample coordinate to the object 6. The third and the fourth optical sensors 22, 24 may be either CMOS image sensors or CCD image sensors.

Referring to FIG. 9, the control unit 12 is a FPGA (Field Programmable Gate Array) and includes a phase-locked loop 26, a frequency generator 28, a parallel-to-serial converter 30 and a buffer 32. The phase-locked loop 26 is connected to the optical sensors 8, 10, 22, 24 for actuating the optical sensors 8, 10, 22, 24 respectively. The frequency generator 28 is connected with the optical sensors 8, 10, 22, 24 respectively for providing a work frequency thereto. The parallel-to-serial converter 30 is connected with the optical sensors 8, 10, 22, 24 for receiving image signals sensed by the first group of sensors A and the second group of sensors B respectively and then transmitting the image signals to the processor 14. The buffer 32 is connected with the parallel-to-serial converter 30 for temporarily memorizing the image signals received by the parallel-to-serial converter 30 so as to make the image signals from the first group of sensors A and the second group of sensors B be transmitted to the processor 14 by the parallel-to-serial converter 30 only once.

Figure 10:
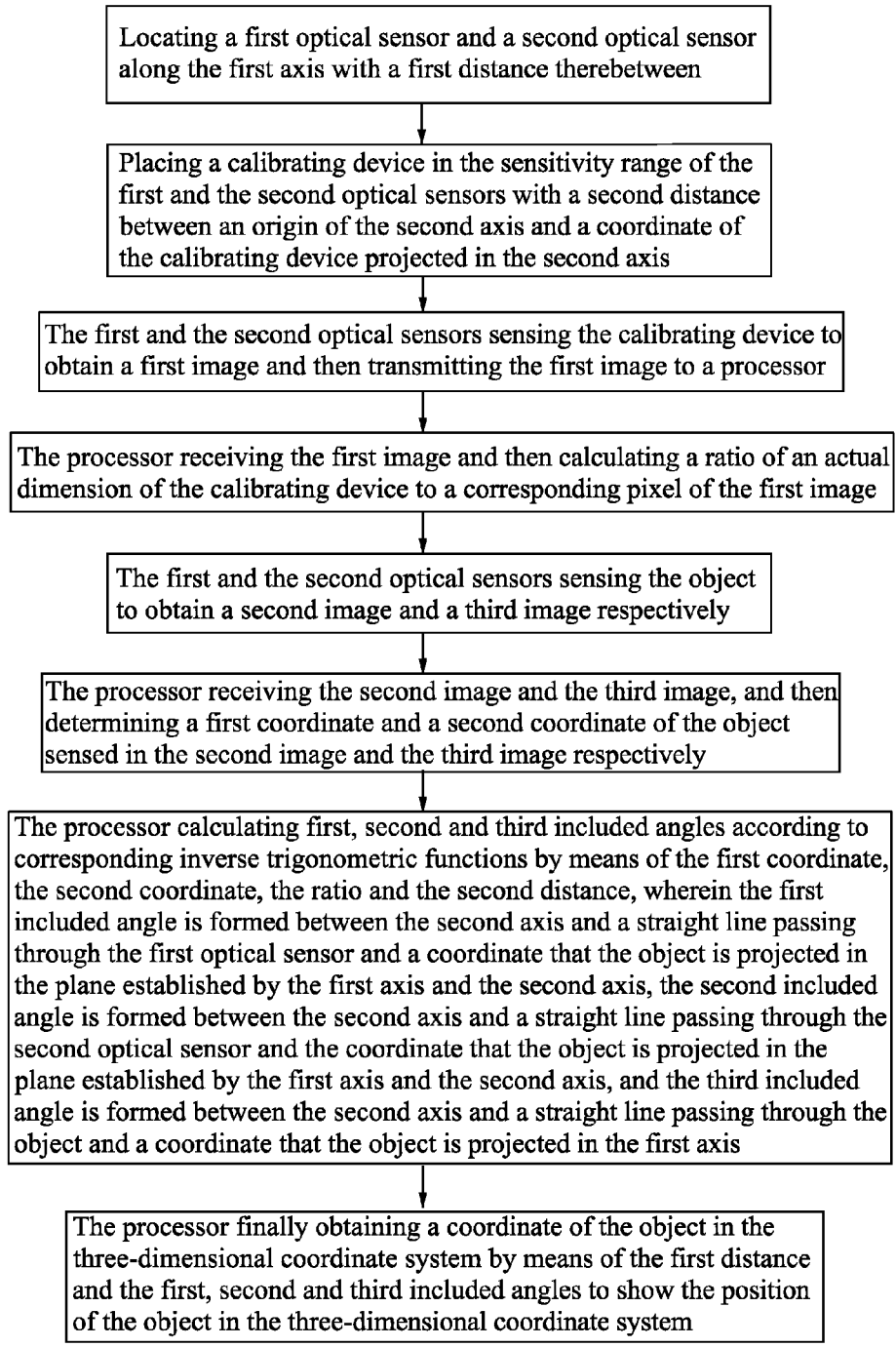
FIG. 10 is a flow chart of a positioning method using the optical positioning apparatus of FIG. 1 to determine the position of the object in the three-dimensional coordinate system.

Referring to FIG. 10, a positioning method using the optical positioning apparatus of the first embodiment to obtain the coordinate (Dx, Dz, Dy) of the object 6 in the three-dimensional coordinate system is described as following.

Step 1, the first optical sensor 8 and the second optical sensor 10 are located along the first axis X with the first distance Df therebetween.

Step 2, the calibrating device 4 is placed in the sensitivity range of the first and the second optical sensors 8, 10 with the second distance Ds between the origin of the second axis Z and a coordinate of the calibrating device 4 being projected in the second axis Z.

Step 3, the first and the second optical sensors 8, 10 sense the calibrating device 4 to obtain the first image 16 and then transmitting the first image 16 to the processor 14.

Step 4, the processor 14 receives the first image 16 and then executes a calibrating procedure, namely the processor 14 calculating the ratio R of the actual dimension of the calibrating device 4 to the corresponding pixel of the first image 16.

Step 5, the first and the second optical sensors 8, 10 sense the object 6 to obtain the second image 18 and the third image (not shown) respectively.

Step 6, the processor 14 receives the second image 18 and the third image, and then determines the first coordinate (x, z, y) and the second coordinate (x', z', y') of the object 6 being sensed in the second image 18 and the third image respectively.

Step 7, the processor 14 calculates the included angles θ1, θr, θ according to the respective inverse trigonometric function based on the first coordinate (x, z, y), the second coordinate (x', z', y'), the ratio R and the second distance Ds, wherein the first included angle θ1 is formed between the second axis Z and the straight line passing through the coordinate (Dx, Dz, 0) and the first optical sensor 8, the second included angle θr is formed between the second axis Z and the straight line passing through the coordinate (Dx, Dz, 0) and the second optical sensor 10, and the third included angle θ is formed between the second axis Z and the straight line passing through the coordinate (Dx, Dz, Dy) and the coordinate (Dx, 0, 0).

Step 8, the processor 14 calculates Dz, Dx, Dy respectively by means of the first distance Df and the included angles θ1, θr, θ to finally obtain the coordinate (Dx, Dz, Dy) of the object 6 in the three-dimensional coordinate system.

As described above, the optical positioning apparatus and the positioning method of the present invention utilize the first and the second optical sensors 8, 10 to sense the calibrating device 4 and the object 6, then utilize the processor 14 to execute the calibrating procedure and finally execute the positioning procedure based on the parallax principle to obtain the coordinate (Dx, Dz, Dy) of the object 6 in the three-dimensional coordinate system. Therefore, the optical positioning apparatus has advantages of easy layout and use. Furthermore, the optical positioning apparatus can obtain an acceleration of the object 6 on account of the 60 Frame/S output from both the first and the second groups of sensors A, B so that omits speed sensors in the prior art. Both the first and the second groups of sensors A, B can also provide a 30 Frame/S output in total even if the surrounding becomes dimmer. So an accurate coordinate (Dx, Dz, Dy) of the object 6 in the three-dimensional coordinate system can be always determined by the optical positioning apparatus of the present invention.

What is claimed is:

1. An optical positioning apparatus adapted for determining a position of an object in a three-dimensional coordinate system which has a first axis, a second axis and a third axis which are perpendicular to one another, comprising:
   a host device having a first optical sensor and a second optical sensor which are located along the first axis with a first distance therebetween, the host device further having a processor connected with the first and the second optical sensors; and
   a calibrating device placed in the sensitivity range of the first and the second optical sensors with a second distance between an origin of the second axis and a coordinate of the calibrating device projected in the second axis, the first and the second optical sensors sensing the calibrating device to make the processor execute a calibrating procedure, then the first and the second optical sensors sensing the object to make the processor execute a positioning procedure for further determining the position of the object in the three-dimensional coordinate system;

wherein the host device further includes a control unit connected between the optical sensors and the processor, and the control unit includes a phase-locked loop connected to the optical sensors for actuating the optical sensors, a frequency generator connected with the optical sensors for providing a work frequency thereto, a parallel-to-serial converter connected with the optical sensors for receiving image signals of the calibrating device and the object sensed by the optical sensors and then transmitting the image signals to the processor, and a buffer connected with the parallel-to-serial converter for temporarily memorizing the image signals received by the parallel-to-serial converter.

2. The optical positioning apparatus as claimed in claim 1, wherein the host device further includes a third optical sensor and a fourth optical sensor which are respectively located beside the first optical sensor and the second optical sensor along the first axis and with the first distance therebetween.

3. The optical positioning apparatus as claimed in claim 2, wherein the optical sensors may be either CMOS image sensors or CCD image sensors.

4. The optical positioning apparatus as claimed in claim 1, wherein the control unit is a field programmable gate array.

5. The optical positioning apparatus as claimed in claim 1, wherein the object has a light source therein for being sensed by the first and the second optical sensors.

6. The optical positioning apparatus as claimed in claim 1, wherein the calibrating device is a calibrating plate made up of a plurality of black blocks and a plurality of white blocks being alternately arranged with one another.

7. An optical positioning method adapted for determining a position of an object in a three-dimensional coordinate system which has a first axis, a second axis and a third axis which are perpendicular to one another, comprising the steps of:

locating a first optical sensor and a second optical sensor along the first axis with a first distance therebetween;

placing a calibrating device in the sensitivity range of the first and the second optical sensors with a second distance between an origin of the second axis and a coordinate of the calibrating device projected in the second axis;

the first and the second optical sensors sensing the calibrating device to obtain a first image and then transmitting the first image to a processor;

the processor receiving the first image and then calculating a ratio of an actual dimension of the calibrating device to a corresponding pixel of the first image;

the first and the second optical sensors sensing the object to obtain a second image and a third image respectively;

the processor receiving the second image and the third image, and then determining a first coordinate and a second coordinate of the object sensed in the second image and the third image respectively;

the processor calculating first, second and third included angles according to corresponding inverse trigonometric functions by means of the first coordinate, the second coordinate, the ratio and the second distance, wherein the first included angle is formed between the second axis and a straight line passing through the first optical sensor and a coordinate that the object is projected in the plane established by the first axis and the second axis, the second included angle is formed between the second axis and a straight line passing through the second optical sensor and the coordinate that the object is projected in the plane established by the first axis and the second axis, and the third included angle is formed between the second axis and a straight line passing through the object and a coordinate that the object is projected in the first axis; and the processor finally obtaining a coordinate of the object in the three-dimensional coordinate system by means of the first distance and the first, second and third included angles to show the position of the object in the three-dimensional coordinate system.

8. The optical positioning method as claimed in claim 7, wherein when calculate a coordinate that the object is projected in the second axis, the sensitivity range of the first and the second optical sensors is firstly divided into three districts along the first axis respectively designated as a second district, a first district and a third district, the first district refers to the space between the first optical sensor and the second optical sensor, the second district refers to the space adjacent to the first optical sensor and away from the second optical sensor, and the third district refers to the space adjacent to the second optical sensor and away from the first optical sensor, then which district is the object located in is determined by the processor according to the first coordinate and the second coordinate so as to make the coordinate that the object is projected in the second axis calculated by means of a corresponding formula.

* * * * *